United States Patent Office 3,050,445
Patented Aug. 21, 1962

3,050,445
STABILIZED TRYPSIN SOLUTION
Charles W. Damaskus, La Grange, and Paul E. Bradford, Kankakee, Ill., assignors, by mesne assignments, to Armour-Pharmaceutical Company, a corporation of Delaware
No Drawing. Filed Aug. 13, 1958, Ser. No. 754,721
4 Claims. (Cl. 195—63)

This invention relates to an aqueous solution of trypsin which is characterized by being substantially stable under ordinary conditions of commercial use.

It has long been known that trypsin tends to be unstable and to become progressively inactivated when dissolved in aqueous solutions. Such inactivation proceeds quite rapidly under refrigeration as well as at room temperature, and for this reason it has not heretofore been possible to manufacture and sell trypsin in the form of an aqueous solution. Such aqueous solutions, however, have definite advantages for both topical and parenteral use in that they are far less expensive and much simpler to administer than conventional crystalline, lyophilized, or oil-suspension trypsin preparations.

It is therefore the general object of this invention to provide a substantially stabilized aqueous solution of trypsin which is satisfactory for commercial manufacture and sale.

This invention is based in part on the discovery that amino acids in combination with a calcium salt have a marked stabilizing action on trypsin in aqueous solution. This action is most significantly manifested at a concentration of the amino acid of from about 0.5% to about 20%, and a calcium salt concentration of from about 0.3% to about 5.0% on a weight volume basis. Preferably, however, the aqueous trypsin solution contains from about 1.0% to about 5.0% by weight of the amino acid and from about 0.9% to about 2.0% by weight of the calcium salt.

In the practice of the present invention, we prefer to employ a non-sulfhydryl and non-disulfide containing amino acid. Among the amino acids which can be used to accomplish the objects of this invention are l-glutamine, glutamic acid, glycine, l-arginine, dl-alanine, l-leucine, dl-isoleucine, l-lysine, dl-methionine, dl-phenylalanine, l-proline, hydroxy-l-proline, dl-serine, dl-threonine, and dl-valine. The preferred concentration of amino acid varies in accordance with the particular acid employed. For example, l-glutamine in a concentration of from about 1.0% to about 5.0% by weight has yielded very satisfactory results. In the case of l-leucine, a concentration of from about 0.5% to about 5.0% by weight has proven to be equally desirable.

Among the calcium salts finding use in our stabilized aqueous trypsin solutions are calcium acetate, calcium citrate, calcium chloride, calcium glycerol phosphate, calcium glucoheptanate, calcium gluconate, calcium lactate, calcium lactobionate, calcium lactophosphate, calcium succinate, calcium pantothonate, and calcium levulinate. To achieve the purposes of this invention, it is apparent that the calcium salt employed should be water-soluble and non-toxic.

In practicing the present invention, we prefer to use a substantially pure trypsin starting material, that is, crystalline or lyophilized trypsin of greater than 95% purity. The trypsin may be prepared as described by Northrop et al., "Crystalline Enzymes," second edition, 1948. The concentration of the trypsin in the aqueous solution is not particularly critical, but for most purposes within the scope of the present invention it will fall within the range of from 1 to 10 mg. of trypsin per cubic centimeter of water. Our preferred formulations contain from about 1 to about 5 mg./cc. The proteolytic activity of the trypsin may be measured by the hemoglobin substrate method and when so measured will average at least 1000 Armour units (A.U.) per mg. and may reach as high as 9000 Armour units (A.U.) per mg. A standard of potency by this method has been set up in terms of "Armour units" (A.U.), which is a modification of the method of Anson described in the "Journal of General Physiology," vol. 22, page 79 (1938). In accordance with this now generally accepted method, the trypsin employed in our solutions may have a potency of from about 2500 A.U./mg. to about 5000 R.U./mg. and our formulations may have a concentration of from about 5000 A.U./cc. to about 25,000 A.U./cc. of water, the preferred concentration being from about 5000 A.U./cc. to about 10,000 A.U./cc.

In preparing the aqueous solution of trypsin, it is desirable to use pyrogen free distilled water, since for pharmaceutical use the final preparation should be sterile and should be free of any toxic contaminants. To achieve the benefits of the present invention, it is preferred that the pH of the solution be on the acid side. Generally, a pH from about 3.5 to about 7.2 is suitable in parenteral preparations. However, a pH between the range of from about 4.0 to about 6.5 is preferred, with optimum results being obtained at a pH of about 5.5. Various non-toxic acids such as hydrochloric acid, acetic acid, and the like can be used to make the necessary pH adjustment. We have discovered that acetic acid is particularly suitable since it not only adjusts the pH to the desired level, but also provides additional acetate ions.

The preferred stabilized aqueous trypsin solutions of this invention may advantageously be provided with a vehicle such as polyethyleneglycol, glycerine, or propyleneglycol. The preferred vehicle for the purpose of this invention is polyethyleneglycol obtainable commercially under the numerical designations 100 to 800, the upward gradation in numerals indicating a lower melting point for the product. The concentration of the vehicle may be from 15% to 45% by weight per unit volume. The preferred range is from about 20% to about 40% by weight volume of the solution.

The trypsin solution may also contain a preservative agent such as sodium ethylmercurithiosalicylate (Merthiolate), methyl p-hydroxybenzoate (methylparaben), and propyl p-hydroxybenzoate (Propylparaben). The latter two preservatives may be used either alone or combined. The use of such a preservative, however, is simply in accordance with well-known practices for pharmaceutical preparations, and does not form a part of the present invention.

The present invention is further illustrated by the following specific examples:

EXAMPLE I

Pharmaceutically useful solutions of trypsin were prepared from pure trypsin in accordance with the following formulations:

*Formula 1*

| | |
|---|---|
| Trypsin | 10,000 A.U./cc. |
| Polyethyleneglycol 200 | 30%. |
| l-Glutamine | 3%. |
| Calcium acetate | 1%. |
| Sodium ethylmercurithiosalicylate | 0.01%. |
| P.F. (pyrogen free) distilled water | Q.s. |
| pH | 5.5. |

*Formula 2*

| | |
|---|---|
| Trypsin | 10,000 A.U./cc. |
| Glycine | 5.0% |
| Calcium acetate | 1.0%. |
| Polyethyleneglycol 200 | 30%. |
| Sodium ethylmercurithiosalicylate | 0.01%. |

Water _____ Q.s.
pH _____ 5.5.

*Formula 3*

Trypsin _____ 10,000 A.U./cc.
l-Lysine _____ 5.0%.
Calcium acetate _____ 1.0%.
Polyethyleneglycol 200 _____ 30%.
Sodium ethylmercurithiosalicylate _ 0.01%.
Water _____ Q.s.
pH _____ 5.5.

*Formula 4*

Trypsin _____ 10,000 A.U./cc.
l-Glutamine _____ 3.0%.
Calcium acetate _____ 1.0%.
Polyethyleneglycol 300 _____ 30%.
Sodium ethylmercurithiosalicylate _ 0.01%.
Water _____ Q.s.
pH _____ 5.5.

*Formula 5*

Trypsin _____ 10,000 A.U./cc.
l-Glutamine _____ 3.0%.
Calcium lactate _____ 1.75%.
Polyethyleneglycol 200 _____ 30%.
Sodium ethylmercurithiosalicylate _ 0.01%.
Water _____ Q.s.
pH _____ 5.5.

*Formula 6*

Trypsin _____ 10,000 A.U./cc.
l-Glutamine _____ 3.0%.
Calcium levulinate _____ 1.75%.
Polyethyleneglycol 200 _____ 30%.
Sodium ethylmercurithiosalicylate _ 0.01%.
Water _____ Q.s.
pH _____ 5.5.

*Formula 7*

Trypsin _____ 20,000 A.U./cc.
l-Glutamine _____ 3.0%.
Calcium acetate _____ 1.0%.
Polyethyleneglycol 200 _____ 30%.
Sodium ethylmercurithiosalicylate _ 0.01%.
Water _____ Q.s.
pH _____ 5.5.

*Formula 8*

Trypsin _____ 10,000 A.U./cc.
l-Glutamine _____ 3.0%.
Calcium acetate _____ 1.0%.
Polyethyleneglycol 200 _____ 30%.
Sodium ethylmercurithiosalicylate _ 0.01%.
Water _____ Q.s.
pH _____ 5.2%.

*Formula 9*

Trypsin _____ 10,000 A.U./cc.
l-Glutamine _____ 3.0%.
Calcium acetate _____ 1.0%.
Polyethyleneglycol 200 _____ 30%.
Sodium ethylmercurithiosalicylate _ 0.01%.
Water _____ Q.s.
pH _____ 5.8.

After the preparation of the solutions according to formulae above, the solutions were sterile filtered and aseptically vialed in 5 cc. vials, stoppered and sealed. The vials were subjected to shelf-life tests both at room temperature and at 37° C. The results of these tests are set out below.

The following stability data were collected. All values are reported as Armour units per cc.

|  | Initial Potency | 37° C., 1 wk. | 37° C., 2 wks. | R.T., 4 wks. |
|---|---|---|---|---|
| Formula 1 | 10,850 | 8,130 | 6,300 | 10,100 |
| Formula 2 | 10,760 | 10,160 | 9,760 | 11,000 |
| Formula 3 | 10,920 | 11,220 | 10,260 | 11,490 |
| Formula 4 | 11,270 | 9,040 | 7,520 | 10,425 |
| Formula 5 | 11,700 | 9,440 | 7,120 | 10,260 |
| Formula 6 | 11,440 | 9,300 | 7,270 | 10,425 |
| Formula 7 | 22,700 | 15,500 | 13,285 | 19,300 |
| Formula 8 | 11,760 | 9,175 | 7,450 | 10,920 |
| Formula 9 | 10,020 | 9,240 | 7,770 | 11,080 |

EXAMPLE II

Further tests were conducted as described in Example I, except that the trypsin solutions were prepared according to the following formulae:

*Formula 1*

Trypsin _____ 10,000 A.U./cc.
Sodium ethylmercurithiosalicylate _ 0.01%.
Glutamine _____ 3.0%.
Calcium acetate _____ 1.0%.
Polyethyleneglycol 200 _____ 15.0%.
Water _____ Q.s.
pH _____ 5.5.

*Formula 2*

Trypsin _____ 10,000 A.U./cc.
Sodium ethylmercurithiosalicylate _ 0.01%.
Glutamine _____ 3.0%.
Calcium acetate _____ 1.0%.
Polyethyleneglycol 200 _____ 45.0%.
Water _____ Q.s.
pH _____ 5.5.

The results obtained by shelf-life tests extending for six weeks with samples of the product at room temperature and at 37° C. are set out below. All values are reported as Armour units per cc.

|  | Initial Potency | 37° C., 1 wk. | 37° C., 2 wks. | 37° C., 3 wks. | R.T., 1 wk. | R.T., 2 wks. | R.T., 3 wks. | R.T., 4 wks. | R.T., 6 wks. |
|---|---|---|---|---|---|---|---|---|---|
| Form. 1 | 10,830 | 5,600 | 3,930 | 3,840 | 11,200 | 11,460 | 11,450 | 10,500 | 10,600 |
| Form. 2 | 10,260 | 6,570 | 4,390 | 4,770 | 11,800 | 11,620 | 12,360 | 10,500 | 11,000 |

While in the foregoing specification certain specific embodiments of the present invention have been set forth for purpose of illustration, it will be understood that the invention is susceptible to other embodiments and that certain of the details set forth herein can be varied considerably without departing from the basic principles of the present invention.

We claim:

1. A substantially stabilized aqueous solution of trypsin characterized by containing from about 0.5% to about 20% by weight of a sulfhydryl and disulfide free amino acid and from about 0.3% to about 5.0% by weight of a water-soluble non-toxic calcium salt, said solution having a pH of from about 3.5 to about 7.2 and having a concentration of trypsin of from about 5000 A.U. to about 25,000 A.U. per cc. of water.

2. A substantially stabilized aqueous solution of trypsin characterized by containing from about 0.5% to about 20% by weight of a sulfhydryl and disulfide free amino acid and from about 0.9% to about 2.0% by weight of a water-soluble non-toxic calcium salt, said solution being at a pH between about 4.5 and about 6.5 and having a concentration of trypsin of from about 5000 A.U. to about 10,000 A.U. per cc. of water, and a vehicle comprising from about 15% to about 45% by weight of said solution.

3. A substantially stabilized aqueous solution of trypsin characterized by containing an amino acid selected from the group consisting of l-glutamine, glycine, l-leucine, and l-lysine and mixtures thereof, said amino acid being present in the concentration of from about 0.5% to about 20% by weight, said solution further containing from about 0.3% to about 5.0% by weight of a calcium salt selected from the group consisting of calcium acetate, calcium glycerol phosphate, calcium gluconate, and calcium lactate, said solution being at a pH from about 4.5 to about 6.5 and having a concentration of trypsin of from about 5000 A.U. to about 25,000 A.U. per cc. of water, and a vehicle comprising from about 15% to about 45% by weight of said solution.

4. A substantially stabilized aqueous solution of trypsin characterized by containing from about 1.0% to about 5.0% by weight of l-glutamine and from about 0.9% to about 2.0% by weight of calcium acetate, said solution being at a pH of about 5.5 and having a concentration of trypsin of from about 5000 A.U. to about 10,000 A.U. per cc. of water, and from about 15% to about 45% by weight of a polyethyleneglycol vehicle.

References Cited in the file of this patent
UNITED STATES PATENTS 2,978,384     Damaskus _____ Apr. 4, 1961

OTHER REFERENCES

Northrup et al.: Crystalline Enzymes, 2nd ed., 1948 (Columbia U. Press, N.Y.), pp. 140–141.

Nord et al.: Arch. Biochem. & Biophysics, 65: 1, pp. 130–131, November 1956.

Sumner et al.: Chemistry & Methods of Enzymes, 3rd ed., 1953, Academic Press, N.Y., pp. 8–10.

Grob.: J. Gen. Physiol., 29: 4, p. 223, Mar. 20, 1946.

Taylor et al.: J.A.M.A., 155: 4, pp. 347–351, May 22, 1954.

Hardy et al.: Surg. Gyn. & Obstet., 100: 1, pp. 91–96, January 1955.